(12) United States Patent
Sahr et al.

(10) Patent No.: US 6,782,966 B2
(45) Date of Patent: Aug. 31, 2004

(54) POWER-ASSISTED STEERING APPARATUS WITH A ONE-PIECE, MONOLITHIC COMPONENT

(75) Inventors: Paul R. Sahr, Lake Orion, MI (US); Richard A. Stoll, Royal Oak, MI (US)

(73) Assignee: TRW Inc., Lyndhurst, OH (US)

( * ) Notice: Subject to any disclaimer, the term of this patent is extended or adjusted under 35 U.S.C. 154(b) by 304 days.

(21) Appl. No.: 09/900,256

(22) Filed: Jul. 6, 2001

(65) Prior Publication Data

US 2003/0006087 A1 Jan. 9, 2003

(51) Int. Cl.⁷ .................................................. B62D 5/083

(52) U.S. Cl. ....................... 180/428; 91/375 A; 180/441

(58) Field of Search ................................ 180/417, 441, 180/428; 267/273, 284, 285, 154; 91/375 A; 74/388 PS

(56) References Cited

U.S. PATENT DOCUMENTS

| | | | |
|---|---|---|---|
| 3,131,554 A | * | 5/1964 | Hornschuch et al. |
| 3,693,470 A | * | 9/1972 | Masuyama .................. 267/154 |
| 4,862,571 A | | 9/1989 | Prinz et al. |
| 5,517,899 A | * | 5/1996 | Bohner ..................... 91/375 A |
| 5,730,040 A | | 3/1998 | Strong |
| 6,021,685 A | * | 2/2000 | Sodona et al. .......... 74/388 PS |
| 6,035,957 A | | 3/2000 | Place |

* cited by examiner

*Primary Examiner*—Anne Marie Boehler
(74) *Attorney, Agent, or Firm*—Tarolli, Sundheim, Covell & Tummino L.L.P.

(57) ABSTRACT

A power-assisted steering apparatus (10) for turning steerable wheels of a vehicle is provided. The apparatus (10) comprises a one-piece monolithic component (16). The one-piece monolithic component (16) includes a pinion gear portion (18) for meshingly engaging a rack bar (14), a valve sleeve portion (20) for cooperating with a valve core (100) to actuate the hydraulic motor (124), and a torsion bar portion (22) extending axially outwardly of the valve sleeve portion (20) opposite the pinion gear portion (18).

9 Claims, 3 Drawing Sheets

POWER-ASSISTED STEERING APPARATUS WITH A ONE-PIECE, MONOLITHIC COMPONENT

TECHNICAL FIELD

The present invention relates to a power-assisted steering apparatus for turning the steerable wheels of a vehicle.

BACKGROUND OF THE INVENTION

A known power-assisted steering apparatus includes a pinion gear, a valve sleeve, and a torsion bar. The pinion gear includes a recessed end for receiving an end of the torsion bar. The end of the torsion bar includes a spline for fixing the end of the torsion bar relative to the pinion gear. A pin connects the valve sleeve to the pinion gear. Care must be taken when assembling the torsion bar, the valve sleeve, and the pinion gear.

SUMMARY OF THE INVENTION

The present invention is a power-assisted steering apparatus for turning steerable wheels of a vehicle. The apparatus comprises a rack bar that is connectable with the steerable wheels of the vehicle. Linear movement of the rack bar turns the steerable wheels. The apparatus also includes a hydraulic motor for, when actuated, moving the rack bar linearly and a one-piece monolithic component. The one-piece monolithic component has a pinion gear portion for meshingly engaging the rack bar, a valve sleeve portion for cooperating with a valve core for actuating the hydraulic motor, and a torsion bar portion for connection with the valve core and twisting in response to rotation of the valve core relative to the valve sleeve portion to actuate the hydraulic motor.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
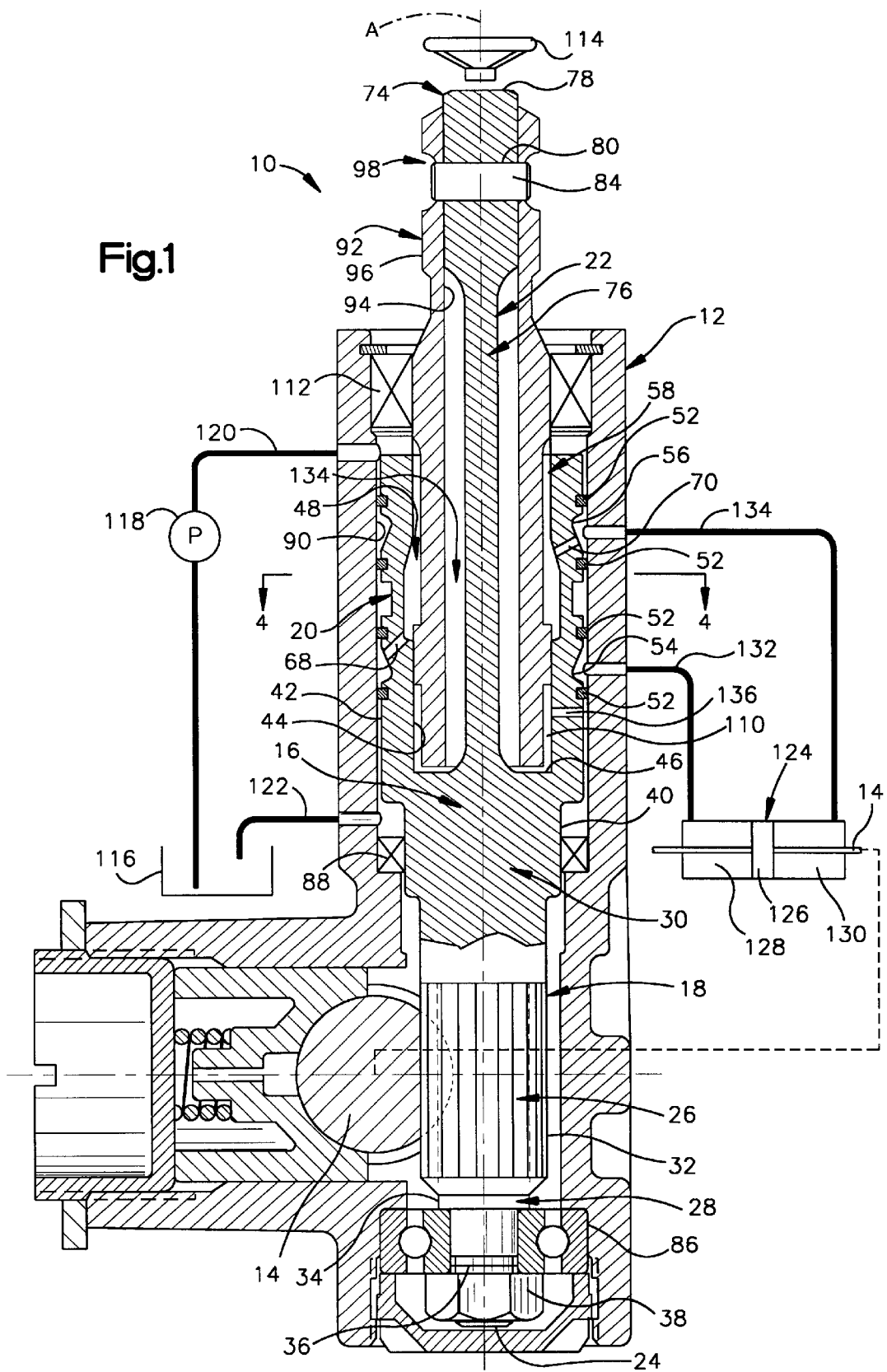
FIG. 1 is a schematic view of a vehicle power-assisted steering apparatus, partially in section, constructed in accordance with the present invention.

The present invention relates to a power-assisted steering apparatus 10 for turning the steerable wheels (not shown) of a vehicle (not shown). FIG. 1 illustrates a sectional view of a power-assisted steering apparatus 10 constructed in accordance with the present invention. The power-assisted steering apparatus 10 of FIG. 1 is hydraulically powered.

The power-assisted steering apparatus 10 includes a housing 12. A longitudinally extending rack bar 14 extends through the housing 12. The rack bar 14 includes a plurality of teeth (not shown). Opposite end portions of the rack bar 14 are connected with the steerable wheels of the vehicle. Linear movement of the rack bar 14 results in the turning of the steerable wheels of the vehicle.

A one-piece monolithic component 16 extends partially through the housing 12 along axis A. Axis A is perpendicular to the longitudinal direction of movement of the rack bar 14. The one-piece monolithic component 16 includes a pinion gear portion 18, a valve sleeve portion 20, and a torsion bar portion 22. The one-piece monolithic component 16 is free of any fasteners for connecting the pinion gear portion 18, the valve sleeve portion 20, and the torsion bar portion 22.

The pinion gear portion 18 of the one-piece monolithic component 16 is cylindrical and forms a first axial end 24 of the one-piece monolithic component 16. The pinion gear portion 18 includes a toothed portion 26, a first support portion 28, and a second support portion 30. The toothed portion 26 is located between the first and second support portions 28 and 30. The toothed portion 26 includes a plurality of teeth 32 for meshingly engaging with the teeth of the rack bar 14.

The first support portion 28 of the pinion gear portion 18 extends axially away from the toothed portion 26 toward the first axial end 24 of the one-piece monolithic component 16. The first support portion 28 has a cylindrical outer surface 34 with a diameter that is less than a diameter of the toothed portion 26. A thread 36 (FIG. 1) for receiving a nut 38 is formed in the cylindrical outer surface 34 of the first support portion 28 and extends axially over approximately one-half the axial length of the first support portion 28 of the pinion gear portion 18.

The second support portion 30 of the pinion gear portion 18 is located adjacent the toothed portion 26 axially opposite the first support portion 28. The second support portion 30 includes a cylindrical outer surface 40 having a diameter that is greater than the diameter of the toothed portion 26 of the pinion gear portion 18.

The valve sleeve portion 20 of the one-piece monolithic component 16 is tubular and is located axially adjacent the pinion gear portion 18. The valve sleeve portion 20 includes a cylindrical outer surface 42 with a diameter that is greater than a diameter of the second support portion 30 of the pinion gear portion 18. A cylindrical inner surface 44 of the valve sleeve portion 20 has a diameter that is less than the diameter of the second support portion 30 of the pinion gear portion 18 but greater than the diameter of the toothed portion 26 of the pinion gear portion 18. A radially extending end wall 46 extends across the first axial end of the valve sleeve portion 20 of the one-piece monolithic component 16. The end wall 46 is contiguous with the second axial end of the second support portion 30 of the pinion gear portion 18 and closes the first axial end of the valve sleeve portion 20. Thus, a cylindrical cavity 48 is formed in the valve sleeve portion 20. The inner surface 44 of the valve sleeve portion 20 and the end wall 46 of the valve sleeve portion 20 define the cylindrical cavity 48.

Figures 2, 3:
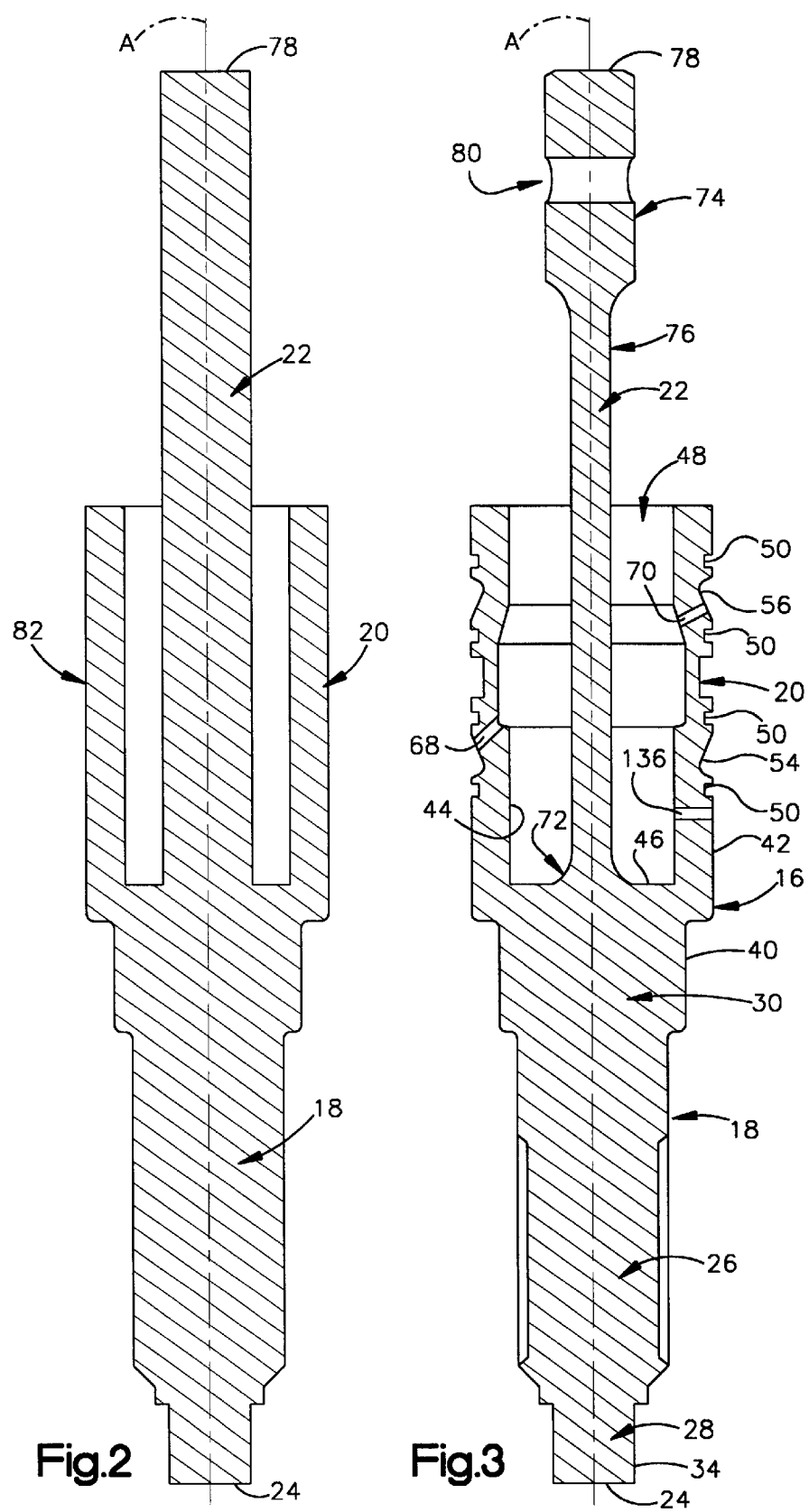
FIG. 2 is a schematic sectional view of a blank for use in forming a one-piece monolithic component of the steering apparatus of FIG. 1.
FIG. 3 is a schematic sectional view of the one-piece monolithic component made from the blank of FIG. 2.

As illustrated in FIG. 3, the outer surface 42 of the valve sleeve portion 20 includes four circumferentially extending grooves 50 (FIG. 3) for receiving seals 52 (FIG. 1). The outer surface 42 also includes first and second annular channels 54 and 56, respectively, for receiving fluid.

Figure 4:
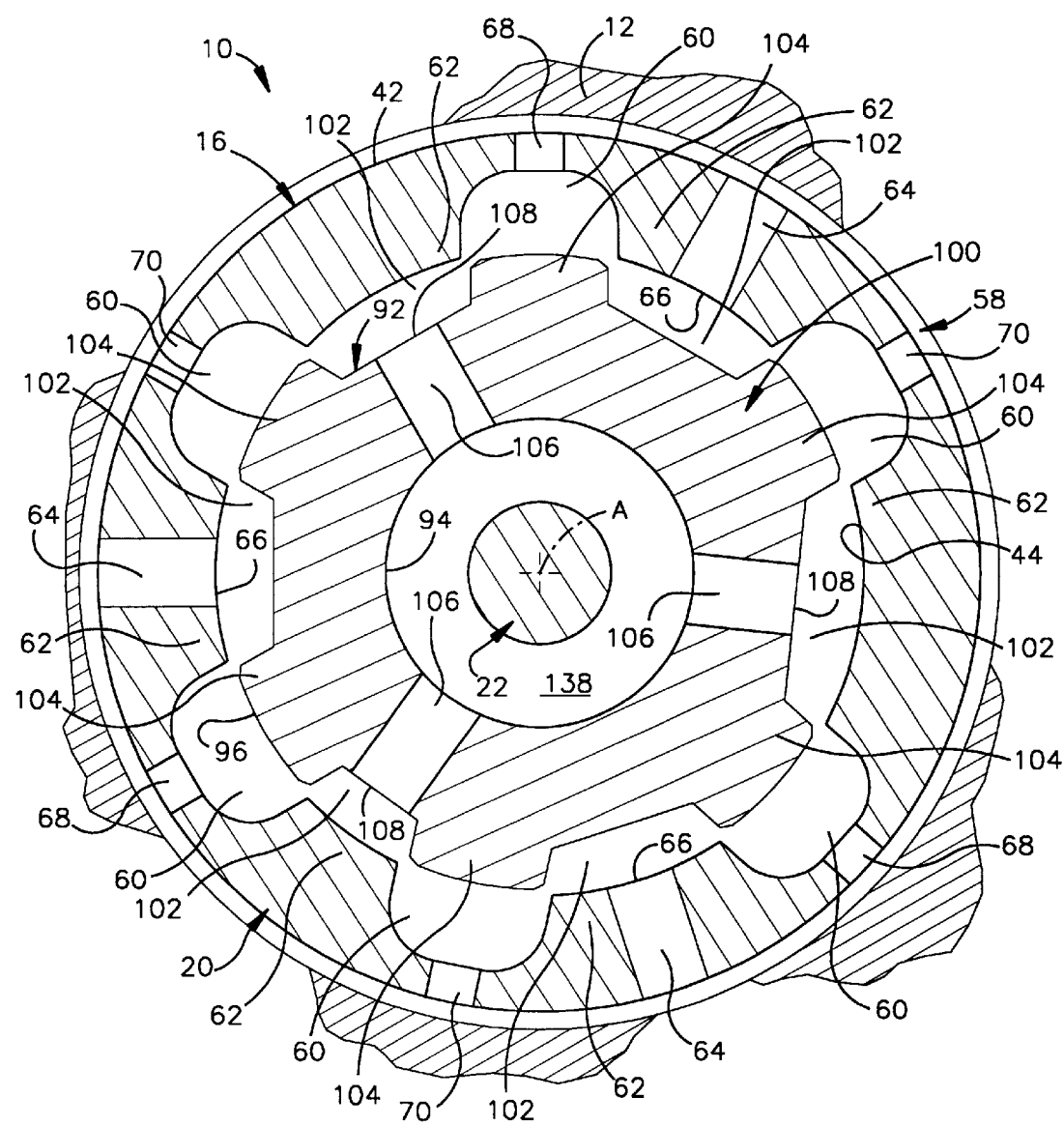
FIG. 4 is a sectional view of a directional control valve of the apparatus of FIG. 1 taken approximately along line 4—4 in FIG. 1.

The valve sleeve portion 20 of the one-piece monolithic component 16 forms part of a directional control valve 58 (FIG. 4) of the power-assisted steering apparatus 10. For clarity, the structures of the directional control valve 58 in FIG. 4 are shown in a single plane. As shown in FIG. 4, the inner surface 44 of the valve sleeve portion 20 includes six axially extending grooves 60. The axially extending grooves 60 terminate short of the second axial end of the valve sleeve portion 20. The six axially extending grooves 60 define six lands 62. Three radially extending passages 64 (FIG. 4) extend between the inner surface 44 of the valve sleeve portion 20 and the outer surface 42 of the valve sleeve portion 20. A port 66 for each passage 64 on the inner surface 44 of the valve sleeve portion 20 is centrally located upon a land 62, equidistant from adjacent grooves 60.

A first set of passages 68 extends radially outwardly through the valve sleeve portion 20 and terminates at the first annular channel 54. As shown in FIG. 4, the first set of passages 68 includes three passages 68. Only one of the passages 68 is shown in FIGS. 1 and 3. One passage 68 from the first set of passages 68 is located in each groove 60 that is located immediately counterclockwise of a radially extending passage 64.

A second set of passages 70 extends radially outwardly through the valve sleeve portion 20 and terminates at the second annular channel 56. As shown in FIG. 4, the second set of passages 70 includes three passages 70. Only one of the passages 70 is shown in FIGS. 1 and 3. One passage 70 from the second set of passages 70 is located in each groove 60 immediately clockwise of a radially extending passage 64.

The torsion bar portion 22 of the one-piece monolithic component 16 is cylindrical and includes a first end portion 72 (FIG. 3), a second end portion 74, and an intermediate portion 76. As best shown in FIG. 3, the first end portion 72 of the torsion bar portion 22 extends axially outwardly of the end wall 46 of the valve sleeve portion 20. The first end portion 72 is frustoconical and a narrow end of the first end portion 72 connects to the intermediate portion 76 of the torsion bar portion 22.

The intermediate portion 76 of the torsion bar portion 22 extends through the cavity 48 in the valve sleeve portion 20 of the one-piece monolithic component 16 and axially outwardly of the valve sleeve portion 20. The intermediate portion 76 of the torsion bar portion 22 has a diameter that is approximately twenty-five percent of the diameter of the inner surface 44 of the valve sleeve portion 20.

The second end portion 74 of the torsion bar portion 22 forms the second axial end 78 of the one-piece monolithic component 16. The second end portion 74 of the torsion bar portion 22 is generally cylindrical and includes a frustoconical portion for connecting to the intermediate portion 76 of the torsion bar portion 22. A hole 80 extends through the second end portion 74 of the torsion bar portion 22 in a direction perpendicular to axis A.

The one-piece monolithic component 16 is formed from a single, homogenous piece of material, preferably a metal alloy. The single, homogenous piece of material is preferably drawn to form the blank 82 illustrated in FIG. 2. The blank 82 includes the pinion gear portion 18, the valve sleeve portion 20, and the torsion bar portion 22.

The blank 82 of FIG. 2 is then machined between centers to ensure that the cylindrical surfaces of the blank 82 are coaxial with one another. The cylindrical surfaces of the blank 82 include the cylindrical surfaces of the pinion gear portion 18, the valve sleeve portion 20, and the torsion bar portion 22. To machine between centers, the blank 82 is supported at a center of the first axial end 24 and a center of the second axial end 78. The blank 82 is then rotated about an axis, shown in FIG. 2 as axis A, connecting the centers. While the blank 82 is rotated, surfaces of the blank 82 are machined to form coaxial cylindrical surfaces. While machining between centers, the intermediate portion 76 of the torsion bar portion 22 is also formed.

After machining between centers, the outer surface 42 and the inner surface 44 of the valve sleeve portion 20 are machined. The axially extending grooves 60 in the inner surface 44 of the valve sleeve portion 20 may be machined by any known method. One known method for machining the axially extending grooves 60 into the inner surface 44 of the valve sleeve portion 20 is disclosed in U.S. Pat. No. 4,862,571 and is assigned to the assignee of the present invention. According to the method disclosed in U.S. Pat. No. 4,862,571, the axially extending grooves 60 on the inner surface 44 of the valve sleeve portion 20 are extended to the second axial end of the valve sleeve portion 20 and then, the second axial end of the valve sleeve portion 20 is displaced inwardly to form a radial extending end surface.

After machining the outer and inner surfaces 42 and 44 of the valve sleeve portion 20, the hole 80 for receiving a pin 84 (FIG. 1) is drilled in the second end portion 74 of the torsion bar portion 22 and the teeth 32 are formed on the toothed portion 26 of the pinion gear portion 18. The pinion gear portion 18 of the one-piece monolithic component 16 is then heat treated in a conventional manner to harden the pinion gear portion 18. Hardening of the pinion gear portion 18 minimizes torsion across the pinion gear portion 18 and also helps to prevent wear associated with the meshing engagement of the pinion gear portion 18 with the rack bar 14.

When the one-piece monolithic component 16 is mounted in the housing 12 of the power-assisted steering apparatus 10, first and second bearings 86 and 88 (FIG. 1) rotationally support the one-piece monolithic component 16 relative to the housing 12. The first bearing 86 extends between the housing 12 and the cylindrical outer surface 34 of the first support portion 28 of the pinion gear portion 18. A nut 38, having a threaded inner surface, secures the first bearing 86 on the first support portion 28 of the pinion gear portion 18. The second bearing 88 extends between the housing 12 and surface 40 of the second support portion 30 of the pinion gear portion 18.

Additionally, four fluid tight seals 52 are interposed between the valve sleeve portion 20 of the one-piece monolithic component 16 and the housing 12. A seal 52 is located in each circumferentially extending groove 50 on the outer surface 42 of the valve sleeve portion 20. An inner diameter of the seal 52 seats in the respective groove 50 and an outer diameter of the seal 52 contacts an inner surface 90 (FIG. 1) of the housing 12. Although the primary purpose of each seal 52 is to prevent fluid from leaking out of an annular channel 54 and 56, the seals 52 also help to maintain the valve sleeve portion 20 of the one-piece monolithic component 16 centered in the housing 12.

The power-assisted steering apparatus 10 also includes an input shaft 92 (FIG. 1). The input shaft 92 is tubular and includes a generally cylindrical inner surface 94 and a generally cylindrical outer surface 96. The outer surface 96 of the input shaft 92 has a diameter that is slightly less than the inner surface 44 of the valve sleeve portion 20 of the one-piece monolithic component 16. The inner surface 94 of the input shaft 92 has a diameter that is approximately equal to the diameter of the second end portion 74 of the torsion bar portion 22 of the one-piece monolithic component 16. The input shaft 92 has an axial length, defined as the distance between a first axial end and a second axial end that is slightly less than an axial length of the torsion bar portion 22 of the one-piece monolithic component 16. A hole 98 extends through the second axial end of the input shaft 92.

The input shaft 92 forms a valve core 100 (FIG. 4) of the directional control valve 58 of the power-assisted steering apparatus 10. As shown in FIG. 4, the valve core 100 includes six axially extending grooves 102. The axially extending grooves 102 define six lands 104. The valve core 100 also includes three radially extending passages 106 that extend between the outer surface 96 and the inner surface 94 of the input shaft 92. Each radially extending passage 106 has a port 108 that is located in an axially extending groove 102 of the valve core 100, equidistant from adjacent lands 104.

As shown in FIG. 1, the second axial end of the input shaft 92 is fixed relative to the second end portion 74 of the torsion bar portion 22 with a pin 84. The pin 84 extends through the hole 98 in the input shaft 92 and through the hole 80 in the second end portion 74 of the torsion bar portion 22 to fix the input shaft 92 to the second end portion 74 of the torsion bar portion 22.

The first axial end of the input shaft 92 is received in the valve sleeve portion 20 of the one-piece monolithic component 16. As shown in FIGS. 1 and 4, the torsion bar portion 22 extends through the interior of the input shaft 92 when the input shaft 92 is mounted relative to the valve sleeve portion 20. When received in the valve sleeve portion 20, the first axial end of the input shaft 92 terminates short of the end wall 46 of the valve sleeve portion 20. As a result, an annular fluid passage 110 is formed between the first axial end of the input shaft 92 and the valve sleeve portion 20 of the one-piece monolithic component 16.

The input shaft 92 is rotatable relative to the housing 12. A third bearing 112 engages the outer surface 96 of the input shaft 92 and supports the input shaft 92 for rotation relative to the housing 12. The third bearing 112 is located axially outwardly of the second axial end of the valve sleeve portion 20. The input shaft 92 is supported for rotation relative to the valve sleeve portion 20 of the one-piece monolithic component 16.

When the power-assisted steering apparatus 10 is mounted in a vehicle, the input shaft 92 is operatively coupled to a steering wheel 114 of the vehicle. Rotation of the steering wheel 114 results in rotation of the input shaft 92. Since the input shaft 92 is fixed relative to the second end portion 74 of the torsion bar portion 22, rotation of the input shaft 92 results in rotation of the second end portion 74 of the torsion bar portion 22. If resistance to the turning of the steerable wheels is above a threshold level, the first end portion 72 of the torsion bar portion 22 will not be rotated by rotation of the second end portion 74 of the torsion bar portion 22. As a result, rotation of the second end portion 74 of the torsion bar portion 22 relative to the first end portion 72 will cause torsion or twisting of the intermediate portion 76 of the torsion bar portion 22.

As shown schematically in FIG. 1, the power-assisted steering apparatus 10 further includes a fluid reservoir 116 and a pump 118. Fluid is transported from the reservoir 116 to the housing 12 through conduit 120. Fluid is returned to the reservoir 116 through conduit 122.

The hydraulic power-assisted steering apparatus 10 also includes a hydraulic motor 124, shown schematically in FIG. 1. The hydraulic motor 124 includes a piston 126 that is formed on the rack bar 14 of the power-assisted steering apparatus 10. The hydraulic motor 124 also includes first and second chambers 128 and 130, respectively, one on each side of the piston 126. As fluid pressure in one of the chambers 128 or 130 increases relative to the other chamber 128 or 130, the piston 126, and the rack bar 14 on which the piston 126 is formed, moves. When the fluid pressure within the first and second chambers 128 and 130 equalizes, the piston 126 stops moving. The movement of the piston 126 in the hydraulic motor 124 is linear movement in a direction parallel to the rack bar 14 and results in the turning of the steerable wheels of the vehicle.

As shown in FIG. 1, conduit 132 provides fluid communication between the first annular channel 54 and the first chamber 128 of the hydraulic motor 124. Conduit 134 provides fluid communication between the second annular channel 56 and the second chamber 130 of the hydraulic motor 124. Fluid flow through conduits 132 and 134 is bi-directional. Thus, when the volume of the first chamber 128 of the hydraulic motor 124 is increasing, fluid flows through conduit 132 toward the hydraulic motor 124 and through conduit 134 away from the hydraulic motor 124. When the volume of the first chamber 128 of the hydraulic motor 124 is decreasing, fluid flows through conduit 134 toward the hydraulic motor 124 and through conduit 132 away from the hydraulic motor 124.

FIG. 4 illustrates the directional control valve 58 of the power-assisted steering apparatus 16 of FIG. 1. Alternate configurations for the directional control valve 58 are contemplated by this invention. The valve core 100 and the valve sleeve portion 20 of the one-piece monolithic component 16 collectively form the directional control valve 58. FIG. 4 illustrates the directional control valve 58 in a neutral position. In the neutral position, hydraulic fluid flows radially inwardly through the radially extending passages 64 in the valve sleeve portion 20 and the pressure within the first chamber portion 128 of the hydraulic motor 124 remains equal to the pressure within the second chamber portion 130 of the hydraulic motor 124.

When the valve core 100 is rotated relative to the valve sleeve portion 20 of the one-piece monolithic component 16, i.e. torsion exists across the intermediate portion 76 of the torsion bar portion 22, the directional control valve 58 moves out of the neutral position and fluid is directed to a respective set of passages 68 or 70. For example, with reference to FIG. 4, if the input shaft 92 is rotated clockwise relative to the valve sleeve portion 20, lands 104 of the valve core 100 move adjacent lands 62 of the valve sleeve portion 20 and fluid flow to the first set of passages 68 is restricted. Conversely, fluid flow to the second set of passages 70 is increased. Thus, pressure increases in the second set of passages 70, in the second annular channel 56, and in the second chamber 130 of the hydraulic motor 124. A higher pressure in the second chamber 130, relative to the pressure in the first chamber 128, results in the volume of the second chamber 130 increasing. When the volume of the second chamber 130 increases, the rack bar 14 moves and the steerable wheels are turned.

As the volume of the second chamber 130 increases, the volume of the first chamber 128 decreases. Fluid flows out of the first chamber 128, through conduit 132 and into the first annular channel 54. Fluid then flows through the first set of passages 68 from the first annular channel 54. The fluid flows through the radially extending passages in the valve core 100 and into a channel 138 formed by the inner surface 94 of the input shaft 92. The fluid then flows through the annular passage 110 and into a radially outwardly extending passage 136 through the valve sleeve portion 20. The fluid is then returned to the reservoir 116 via conduit 122.

The power-steering apparatus 10 including the one-piece monolithic component 16 provides many advantages over prior art power-assisted steering apparatuses. Firstly, since the one-piece monolithic component 16 is formed by machining between centers, there is a high probability that the torsion bar portion 22 will be coaxial with the valve sleeve portion 20. Secondly, assembly of the power-assisted steering apparatus 10 is simplified as the pinion gear, the valve sleeve, and the torsion bar are connected to one another as a one piece unit. Thirdly, the potential for improper relative positioning between the pinion gear, the valve sleeve, and the torsion bar is eliminated. Improper relative positioning between the pinion gear, the valve sleeve, and the torsion bar could occur if the pinion gear, the valve sleeve, and the torsion bar are separate parts to be assembled together. Lastly, the process of forming the one-piece monolithic component 16 can result in less scrap than when the pinion gear, the valve sleeve, and the torsion bar are separately formed.

From the above description of the invention, those skilled in the art will perceive improvements, changes and modifications. Such improvements, changes and modifications within the skill of the art are intended to be covered by the appended claims.

Having described the invention, the following is claimed:

1. A power-assisted steering apparatus for turning steerable wheels of a vehicle, the apparatus comprising:
   a rack bar connectable with the steerable wheels of the vehicle, linear movement of the rack bar turning the steerable wheels;
   a hydraulic motor for, when actuated, moving the rack bar linearly;
   a valve core rotatable to actuate the hydraulic motor; and
   a one-piece, monolithic component having a pinion gear portion for meshingly engaging the rack bar, a valve sleeve portion for cooperating with the valve core for actuating the hydraulic motor, and a torsion bar portion having a first end for connection with the valve core and a second end fixedly connected to the valve sleeve portion, the torsion bar portion, in response to rotation of the valve core to actuate the hydraulic motor, twisting relative to the valve sleeve portion and relative to the pinion gear portion.

2. The power-assisted steering apparatus of claim 1 further being defined by:
   the valve sleeve portion including a cavity for receiving the valve core.

3. The power-assisted steering apparatus of claim 2 further being defined by:
   an inner surface of the valve sleeve portion defines the cavity, the inner surface including a plurality of lands and grooves for directing fluid to the hydraulic motor.

4. The power-assisted steering apparatus of claim 1 further being defined by:
   the pinion gear portion, the valve sleeve portion, and the torsion bar portion of the one-piece monolithic component being coaxial.

5. A power-assisted steering apparatus for turning steerable wheels of a vehicle, the apparatus comprising:
   a rack bar connectable with the steerable wheels of the vehicle, linear movement of the rack bar turning the steerable wheels;
   a hydraulic motor for, when actuated, moving the rack bar linearly; and
   a one-piece, monolithic component having a pinion gear portion for meshingly engaging the rack bar, a valve sleeve portion for cooperating with a valve core for actuating the hydraulic motor, and a torsion bar portion for connection with the valve core and twisting in response to rotation of the valve core relative to the valve sleeve portion to actuate the hydraulic motor, the pinion gear portion of the one-piece monolithic component being heat treated and the torsion bar portion not being heat treated.

6. The power-assisted steering apparatus of claim 5 further being defined by:
   the pinion gear portion of the one-piece monolithic component having a hardness that is sufficient to minimize torsion when the valve core is rotated relative to the pinion gear portion.

7. The power-assisted steering apparatus of claim 1 further being defined by:
   the one-piece monolithic component being formed from a homogenous material.

8. The power-assisted steering apparatus of claim 1 further being defined by:
   the second end of the torsion bar portion forming a frustoconical portion having a wide end fixed to the valve sleeve portion and a narrow end opposite the wide end.

9. A power-assisted steering apparatus for turning steerable wheels of a vehicle, the apparatus comprising:
   a rack bar connectable with the steerable wheels of the vehicle, linear movement of the rack bar turning the steerable wheels;
   a hydraulic motor for, when actuated, moving the rack bar linearly;
   a valve for controlling fluid flow to the hydraulic motor;
   a rotatable tubular input shaft including a rotatable valve core, the valve core having a plurality of axially extending grooves defining a first part of the valve; and
   a one-piece, monolithic component having a pinion gear portion for meshingly engaging the rack bar, a valve sleeve portion forming a second part of the valve for cooperating with the plurality of grooves of the valve core for actuating the hydraulic motor, and a cylindrical torsion bar portion having a first end connected with the valve core, a second end fixedly connected to the valve sleeve portion, and an intermediate portion axially interposed between the first end and the second end;
   relative rotation of the valve core and the valve sleeve portion actuating the hydraulic motor;
   the pinion gear portion having a first support portion, a second support portion axially opposite the first support portion, and a toothed portion interposed between the first support portion and the second support portion, the first and second support portions being supported for rotation;
   the valve sleeve portion being radially interposed between the housing and the valve core, the valve sleeve portion having a cylindrical cavity;
   the torsion bar portion and the tubular input shaft being located at least partially within the cylindrical cavity of the valve sleeve portion;
   the intermediate portion of the torsion bar portion, in response to rotation of the valve core relative to the valve sleeve portion to actuate the hydraulic motor, twisting relative to the valve sleeve portion and the pinion gear portion, the intermediate portion of the torsion bar portion extending through the cylindrical cavity of the valve sleeve portion and extending out of the cylindrical cavity;
   the pinion gear portion, the valve sleeve portion, the cylindrical cavity of the valve sleeve portion, the torsion bar portion, and the tubular input shaft all extending coaxially.

* * * * *